United States Patent
Raduchel

(10) Patent No.: US 8,049,611 B2
(45) Date of Patent: Nov. 1, 2011

(54) LOCATION MECHANISM FOR MOBILE DEVICE

(75) Inventor: William J. Raduchel, Palo Alto, CA (US)

(73) Assignee: eIngot LLC, Great Falls, VA (US)

(*) Notice: Subject to any disclaimer, the term of this patent is extended or adjusted under 35 U.S.C. 154(b) by 415 days.

(21) Appl. No.: 12/137,920

(22) Filed: Jun. 12, 2008

(65) Prior Publication Data

US 2008/0309485 A1  Dec. 18, 2008

Related U.S. Application Data

(60) Provisional application No. 60/943,630, filed on Jun. 13, 2007.

(51) Int. Cl.
*G08B 29/00* (2006.01)

(52) U.S. Cl. .................... 340/506; 340/539.13

(58) Field of Classification Search .......... 340/539.1, 340/539.11, 539.13, 539.15, 539.17, 505, 340/506, 7.55, 7.56; 379/142.04, 142.17, 379/93.23; 455/415, 420
See application file for complete search history.

(56) References Cited

U.S. PATENT DOCUMENTS

| | | | |
|---|---|---|---|
| 5,475,863 A * | 12/1995 | Simpson et al. ............. | 455/458 |
| 6,937,150 B2 | 8/2005 | Medema et al. | |
| 7,039,170 B1 | 5/2006 | Sylvain | |
| 7,426,264 B1 * | 9/2008 | Henderson ............... | 379/142.04 |
| 7,454,000 B1 * | 11/2008 | Henderson ............... | 379/142.04 |
| 2003/0083903 A1 * | 5/2003 | Myers ............................. | 705/2 |
| 2006/0277590 A1 | 12/2006 | Limont et al. | |
| 2006/0287783 A1 | 12/2006 | Walker | |
| 2007/0006289 A1 | 1/2007 | Limont et al. | |
| 2007/0077924 A1 * | 4/2007 | Bhogal et al. ............. | 455/420 |
| 2007/0082676 A1 | 4/2007 | Bhogal et al. | |
| 2007/0217398 A1 | 9/2007 | Batni et al. | |
| 2007/0264978 A1 | 11/2007 | Stoops | |

\* cited by examiner

*Primary Examiner* — Van T. Trieu
(74) *Attorney, Agent, or Firm* — Fish & Richardson P.C.

(57) ABSTRACT

A location mechanism for a mobile device, in which an electronic communication including a code is received at the mobile device and the code is parsed from within the received electronic communication. The code parsed from within the electronic communication is used to determine whether to classify the received electronic communication as a coded electronic communication, and the received electronic communication is classified as a coded electronic communication based on results of the determination. In response to classification of the electronic communication as a coded electronic communication, a process is initiated that facilitates location of the mobile device. For instance, volume control settings at the mobile device may be overridden and an audible alert at the device may be invoked, and/or a response electronic communication that includes location information indicative of a current location of the communication device may be generated and sent.

20 Claims, 5 Drawing Sheets

(12) United States Patent
US 8,049,611 B2

LOCATION MECHANISM FOR MOBILE DEVICE

CROSS-REFERENCE TO RELATED APPLICATIONS

This application claims priority from U.S. Provisional Application No. 60/943,630, filed on Jun. 13, 2007, and entitled "Audible Location Mechanism for Mobile Device." The entire content of the prior application is incorporated herein by reference.

FIELD

The present disclosure generally relates to facilitating location of mobile devices.

BACKGROUND

The portable nature and small size of mobile devices makes misplacing mobile devices common. Once misplaced, mobile devices may be difficult to locate.

SUMMARY

Implementations of the described techniques may include hardware, a method or process, or computer software on a computer-accessible medium.

The details of one or more implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

Figure 1:
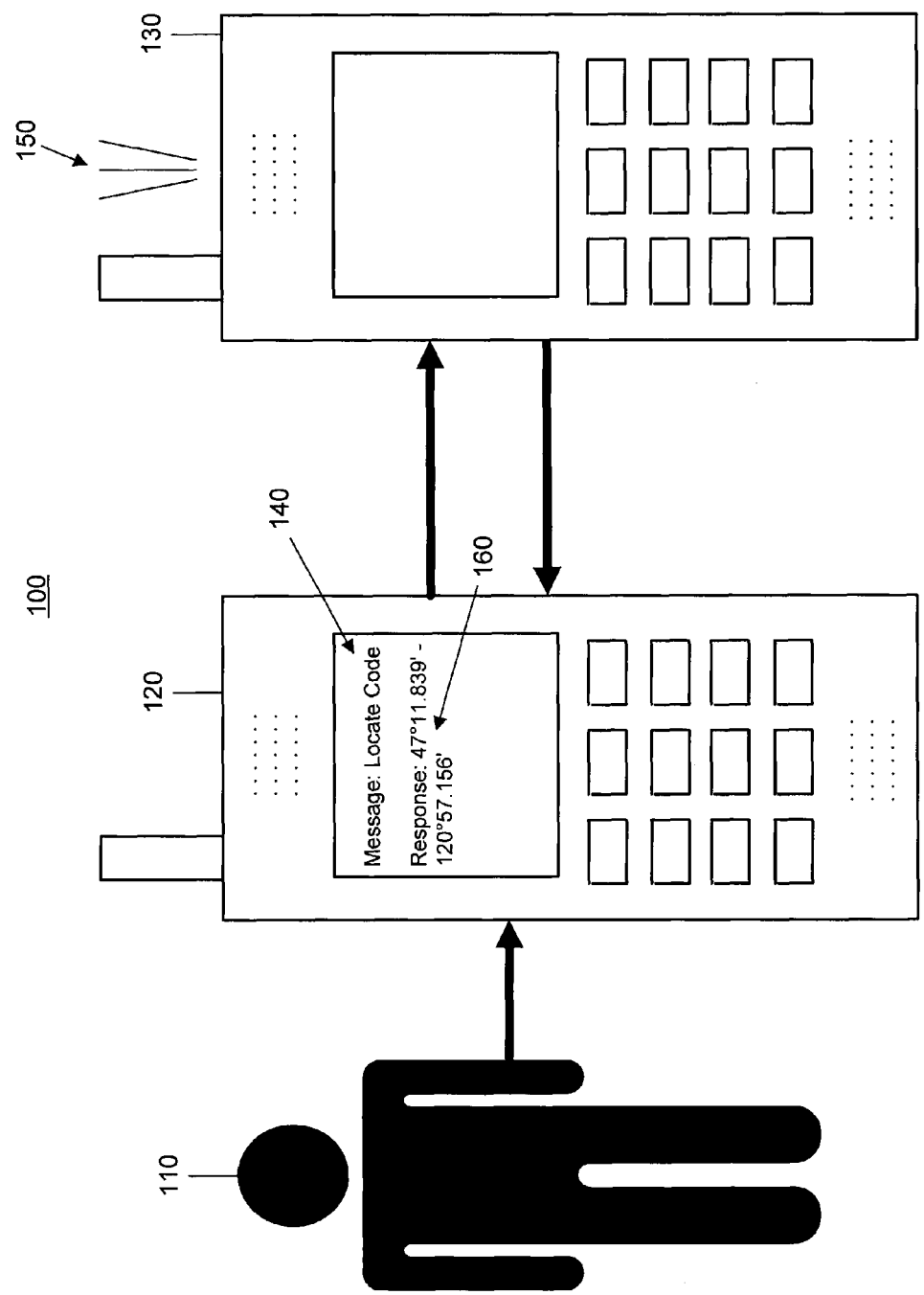
FIG. 1 is a contextual diagram demonstrating location mechanisms for a mobile device.

Techniques are described for initiating processes that facilitate location of a mobile device. A remote user of a misplaced mobile device may send a text message with a particular code to the misplaced mobile device to initiate one or more processes that facilitate location of the misplaced mobile device. For instance, receipt of the text message with the particular code may cause the misplaced mobile device to invoke an audible alert (e.g., invoke a ringer) or cause the mobile device to send a return text message that includes information related to a current location of the mobile device (e.g., Global Positioning System (GPS) data).

In some examples, techniques are provided for invoking an audible alert of a mobile device. The mobile device is configured to receive electronic communications and may be configured in a mode in which the audible alert is disabled (e.g., a silent mode or a vibrate mode). The mobile device receives an electronic communication and determines whether the electronic communication is a coded electronic communication (e.g., an electronic communication that includes a particular message or an electronic communication that is encrypted with a particular key). If the electronic communication is a coded electronic communication, the mobile device invokes an audible alert of the mobile device (e.g., causes a ringer associated with the mobile device to ring). Receipt of a coded electronic communication may cause invocation of the audible alert of the mobile device even when the mobile device is configured in a mode in which the audible alert is disabled (e.g., a silent mode or a vibrate mode). For example, receipt of a coded electronic communication may override volume control settings at the mobile device if the volume control settings of the mobile device are configured for a silent setting.

In some implementations, a cellular telephone, set in silent mode, receives a coded text or Short Message Service ("SMS") message and invokes a ringer of the cellular telephone in response to receiving the coded text or SMS message. By invoking the ringer in response to receiving the coded text message, a user may be able to locate the cellular telephone more easily when misplaced or be alerted to an important event. For example, if the cellular telephone is misplaced when the volume control settings of the cellular telephone are set in a silent mode, receipt the coded text message may override the silent mode setting and cause the ringer to ring.

Implementations may assist a user in locating a mobile device that has been misplaced when the volume control settings of the mobile device are configured for a silent setting. In one example, a user/owner of a mobile telephone may call the mobile telephone to invoke a ringer of the mobile telephone to assist the user in locating the mobile telephone. In this example, the mobile telephone may receive the call placed by the user/owner and identify that the call is from the user/owner. In response to identifying that the call is from the user/owner, the mobile telephone may override or disregard the silent setting of the mobile telephone and invoke the ringer of the mobile telephone, thereby assisting the user/owner in locating the mobile telephone. Further, in this example, if the mobile telephone receives a call from a person other than the user/owner of the mobile telephone, the mobile telephone may not override or disregard the silent setting of the mobile telephone and not invoke the ringer. In other implementations, a telephone service provider may be configured to identify that the call to the mobile telephone is from the user/owner and send a coded electronic communication (e.g., a coded text message) or other type of control signal to invoke the ringer of the mobile telephone.

In another example, the user/owner of a mobile device may send a text or SMS message to the mobile device that includes a specific code in the text portion of the message. In this example, the mobile device may receive the text message including the specific code and parse the text portion of the text message to identify the specific code. In response to identifying the specific code, the mobile device may override or disregard the silent setting of the mobile device and invoke the ringer of the mobile device, thereby assisting the user/owner in locating the mobile device. Further, in this example, if the mobile device receives a text message that does not include the specific code from the user/owner of the mobile device (or another sender), the mobile device may not override or disregard the silent setting of the mobile telephone and not invoke the ringer. In other examples, the sender of the text message including the specific code may be used in addition to or instead of the code to determine whether to invoke the ringer of the mobile device.

Implementations may enable a first user to alert a second user of important events (e.g., emergencies) when the second user is in possession of a mobile device in which the volume control settings of the mobile device are configured for a silent setting. In one example, the first user may place a call to the mobile device of the second user to alert the first user of an important event. In this example, the mobile device may receive the call and identify that the call is from the first user. In response to identifying that the call is from the first user, the mobile device may override or disregard the silent setting of the mobile device and invoke a ringer of the mobile device, thereby alerting the second user of the call from the first user. Further, in this example, if the mobile device receives a call from a third user that is not authorized to override settings of the mobile device to alert the user of important events, the mobile device may not override or disregard the silent setting of the mobile telephone and not invoke the ringer.

In another example, the first user may send a text or SMS message to the mobile device of the second user that includes a specific code in the text portion of the message. In this example, the mobile device may receive the text message including the specific code and parse the text portion of the text message to identify the specific code. In response to identifying the specific code, the mobile device may override or disregard the silent setting of the mobile device and invoke the ringer of the mobile device, thereby alerting the second user that the first user is attempting to contact the second user. Further, in this example, if the mobile device receives a text message that does not include the specific code from the first user (or another user), the mobile device may not override or disregard the silent setting of the mobile telephone and not invoke the ringer. In other examples, the user identity of the sender of the text message including the specific code may be used in addition to the code to determine whether to invoke the ringer of the mobile device.

Implementations also may include overriding other settings of a device. For example, a user of a telephone may turn off a call waiting feature when the user is on an important telephone call. In this example, receipt of a call from a particular user and/or receipt of a coded electronic communication may override this setting and provide an audible alert (or other call waiting feature) to the user while the user is on the important telephone call.

In some implementations, different levels of codes may exist such that associating a first code with an electronic communication may enable a user to override a first set of one or more settings and associating a second code with an electronic communication may enable the user to override a second set of one or more settings. For example, a mobile device may be configured to override a silent setting of the mobile device, but not a disabled call waiting setting of the mobile device in response to receiving an electronic communication that includes a first code. Further, the mobile device may be configured to override both a silent setting of the mobile device and a disabled call waiting setting of the mobile device in response to receiving an electronic communication that includes a second code. In this example, when the settings of the mobile device are configured to disable call waiting and the user of the mobile device is currently engaged in a telephone call, the mobile device will override the disabled call waiting setting in response to receiving an electronic communication including the second code, but will not override the disabled call waiting setting in response to receiving an electronic communication including the first code.

FIG. 1 is a contextual diagram 100 demonstrating location mechanisms for a mobile device. As shown, the contextual diagram 100 illustrates an example of sending a coded text message to a mobile device to initiate processes that facilitate location of the mobile device. The contextual diagram 100 shows a user 110 using a mobile device 120 to send a coded text message 140 to a mobile device 130 to cause the mobile device 130 to initiate, without human intervention, one or more processes that facilitate location of the mobile device 130.

The user 110 may be a person that owns or uses the mobile device 130. The user 110 may have misplaced the mobile device 130 and may be attempting to locate the mobile device 130. To assist in the location process, the user 110 may use the mobile device 120 to send a coded text message 140 to the mobile device 130. The coded text message 140 may include a particular passcode or password that represents a command that causes the mobile device 130 to initiate one or more processes that facilitate location of the mobile device 130. The mobile device 120 may be a second mobile device owned or used by the user 110 or may be a mobile device the user 110 borrowed from another user.

The user 110 uses the mobile device 120 to send a coded text message 140 to the mobile device 130. For example, the user 110 may enter the text "Locate Code" using a keypad of the mobile device 120 and send the entered text to the mobile device 130 as an SMS message. The coded text message 140 is sent from the mobile device 120 to the mobile device 130 over a network (e.g., a cellular telephone network).

When the mobile device 130 receives the coded text message 140, the mobile device 130 processes the coded text message without human intervention. For instance, the mobile device 130 may parse the text from the coded text message 140 (i.e., "Locate Code") and compare the parsed text to a list of one or more recognized codes. The list of recognized codes may have one or more functions associated with each of the recognized codes included in the list. Accordingly, when the parsed text from the coded text message 140 matches a recognized code, the mobile device 130 automatically, without human intervention, performs the one or more functions associated with the recognized code that matches the parsed text from the coded text message 140. When the parsed text from the coded text message 140 does not match a recognized code, the mobile device 130 processes the text message as an ordinary text message (e.g., placing the text message in an inbox of text messages) without performing any additional function.

In the example illustrated in FIG. 1, the text "Locate Code" included in the coded text message 140 matches a recognized code that is associated with two functions that facilitate location of the mobile device 130. The two functions cause the mobile device 130 to automatically, without human intervention, invoke an audible alert 150 and send a response text message 160 that includes GPS location data captured by the mobile device 130. As such, when a text message with the text "Locate Code" is received, the mobile device 130 automatically, without human intervention, invokes an audible alert 150 and sends a response text message 160 that includes GPS location data captured by the mobile device 130, thereby assisting the user 110 in locating the mobile device 130.

In invoking the audible alert 150, the mobile device 130 may bypass volume control settings on the mobile device 130. For example, when the mobile device 130 was misplaced, a silent or vibrate setting of the mobile device 130 may have been set such that a speaker of the mobile device 130 is disabled and the mobile device 130 would not emit an audible alert (e.g., ring) when a typical call or text message is received by the mobile device 130. Because the coded text message 140 matches a recognized code, the volume control settings may be bypassed to invoke the audible alert 150. Bypassing the volume control settings may enable invocation of the audible alert to assist in locating the mobile device 130, even when the mobile device 130 is configured in a mode that otherwise would prevent invocation of audible alerts.

In sending the response text message 160, the mobile device 130 may determine a return communication address (e.g., a telephone number, email address, etc.) associated with the mobile device that sent the coded text message 140. The return communication address may be determined using a caller identification process on the coded text message 140 received from the mobile device 120. In some examples, the mobile device 130 may send the response text message to one or more communication addresses (which may or may not include a communication address for the mobile device 120) previously stored on the mobile device 130 and designated to receive a text message including location information upon receipt of a text message with the text "Locate Code."

The location information included in the response text message 160 may be based on GPS data obtained by the mobile device 130 in response to receipt of the coded text message 140. For instance, longitude and latitude coordinates obtained from GPS data for a current position of the mobile device 130 may be included in the response text message 160. The GPS data also may be used to identify a current street address for the mobile device and the current street address may be sent in the response text message 160.

The mobile device 120 receives the response text message 160 and renders a display of the location information included in the response text message. The displayed location information may include longitude and latitude coordinates obtained from GPS data or a street address. The displayed location information also may, automatically, without human intervention, include a map of an area surrounding the current location of the mobile device 130 and/or directions from a current location of the mobile device 120 to the current location of the mobile device 130. Receipt and display of the location information may assist the user 110 in locating the mobile device 130.

In some implementations, a tariff or other fee may be used to prevent abuse of sending coded electronic communications to a mobile device. For instance, a sender of a coded electronic communication may be charged one dollar each time the sender sends a coded electronic communication to a mobile device. By charging a fee to the sender of coded electronic communications, abuse of the system may be deterred and use of the described location mechanisms may be limited to situations in which the location mechanisms are necessary. The user/owner the electronic device that received the coded electronic communication may be charged in addition to the sender or instead of the sender.

In some examples, the mobile device 130 may be configured to analyze characteristics of an invoked audible alert and send a response electronic communication based on the analysis. For instance, the mobile device 130 may include a microphone that captures an electrical representation of an invoked audible alert. The mobile device 130 may analyze the captured electrical representation of the invoked audible alert to determine characteristics of the environment in which the mobile device is located. For example, the mobile device 130 may determine whether acoustic characteristics of the invoked audible alert are compressed (e.g., the mobile device is placed in a bag) or exhibit an echo (e.g., the mobile device is positioned an open room). Based on the acoustic characteristics of the invoked audible alert, the mobile device 130 may send a response electronic communication that identifies a characteristic of the location of the mobile device 130 that may assist the user 110 in finding the mobile device 130 (e.g., "The mobile device appears to be in a confined space, such as a purse").

The location mechanisms described throughout this application also may be used in contexts other than locating a mobile device. For instance, the location mechanisms may be used for social purposes. In one example, sending a coded electronic communication to a mobile device to invoke an audible alert may be used when another user needs to inform the user/owner of the mobile device of an emergency or other important event and the user/owner of the mobile device is not responding to traditional mechanisms for contacting the mobile device (e.g., placing a call to the mobile device or sending a regular text message to the mobile device).

Implementations in which the mobile device is configured to send an electronic communication in response to a coded electronic communication may be used for social purposes. In this regard, the mobile device may be configured to provide location information in a response electronic communication to another user trying to reach the user/owner of the mobile device when the user/owner of the mobile device is not responding to traditional mechanisms for contacting the mobile device. For instance, when the user/owner of the mobile device is driving home from work and taking an important conference call during the drive home, the mobile device may be configured to provide location information of the user/owner of the mobile device in a response electronic communication when the spouse of the user/owner of the mobile device sends a coded electronic communication to the mobile device. The response electronic communication may include specific information regarding the location of the mobile device (e.g., longitude/latitude coordinates or a street address) or may include a more general statement of the location of the user/owner of the mobile device (e.g., the user/owner appears to be driving home from work, the user/owner appears to be at work, etc.).

The mobile device also may be configured to access an electronic calendar for the user/owner of the mobile device and provide calendar information in a response electronic communication. For instance, in the example discussed above in which the user/owner of the mobile device is driving home from work and taking an important conference call during the drive home, the mobile device may access electronic calendar information that indicates that the user/owner of the mobile device is scheduled to take an important call with a client when the coded electronic communication is received. The response electronic communication initiated by the coded electronic communication may include the accessed calendar information in addition to the location information. For example, the response electronic communication may be "The user/owner appears to be driving home from work and is currently scheduled to take an important call with a client."

Figure 2:
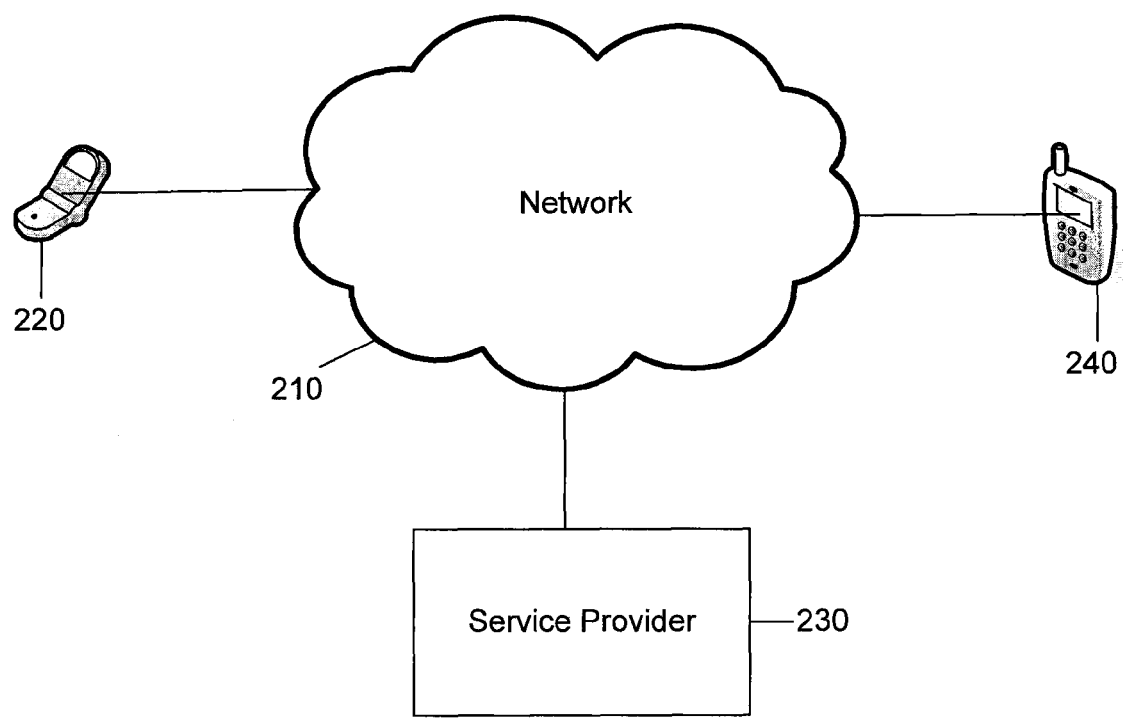
FIG. 2 is a block diagram of a communications system configured to exchange electronic communications.

Referring to FIG. 2, a communications system 200 is configured to exchange electronic communications. The communications system 200 includes a mobile device 220, a service provider 230, and a communication device 240. The service provider 230 facilitates communications between the mobile device 220 and the communication device 240 over network 210.

The network 210 is configured to enable exchange of electronic communications between devices connected to the network 210. For example, the network 210 may be configured to enable exchange of electronic communications between the mobile device 220, the service provider 230, and the communication device 240. The network 210 may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. Network 210 may include multiple networks or subnetworks, each of which may include, for example, a wired or wireless data pathway. The network 210 may include a circuit-switched voice network, a packet-switched data network, or any other network able to carry electronic communications. For example, the network 210 may include networks based on the Internet protocol (IP) or asynchronous transfer mode (ATM), and may support voice using, for example, VoIP, Voice-over-ATM, or other comparable protocols used for voice data communications. In one implementation, the network 210 includes a cellular telephone network configured to enable exchange of text or SMS messages.

The mobile device 220 is configured to exchange electronic communications with the communication device 240 through service provider 230. The mobile device 220 may be any mobile device configured to exchange electronic communications over a network. For example, the mobile device 220 may be a wireless phone, a cellular phone, a mobile personal digital assistant (PDA) with embedded cellular phone technology, or a smart phone.

The service provider 230 is configured to facilitate electronic communications between the mobile device 220 and the communication device 240. For example, the mobile device 220 may establish a connection with service provider 230 through network 210 and the service provider 230 may establish a connection with the communication device 240. The service provider 230 may arrange a connection between the mobile device 220 and the communication device 240 through the network 210 such that the mobile device 220 and the communication device 240 may exchange communications directly after the connection is arranged. Alternatively or additionally, the service provider 230 may receive electronic communications from mobile device 220 or communication device 240 and route the electronic communications to the appropriate device. For example, the service provider 230 may receive, from the communication device 240, a text or SMS message addressed to the mobile device 220. Upon receipt of the message, the service provider 230 routes the message to mobile device 220. In one implementation, the service provider 230 is a cellular telephone service provider configured to facilitate exchange of voice and/or data communications. In another implementation, the service provider 230 is a electronic system configured to provide services to users, including data and/or voice services. The services may include communications services, such as, for example, one or more of e-mail services, instant messaging services, chat services, VoIP services, text or SMS messaging services, and traditional telephony services, and content provisioning services, such as, for example, Internet access (e.g., access to the World Wide Web) and/or access to online content (e.g., access to otherwise restricted or proprietary content).

The communication device 240 is configured to exchange electronic communications with the mobile device 220. For example, the communication device 240 may be configured to receive communications from and/or send communications to the mobile device 220. For example, the communication device 240 may be configured to send text or SMS messages to the mobile device 220 and/or receive text or SMS messages from the mobile device 220. In another example, the communication device 240 may be configured to place calls to the mobile device 220 and/or receive calls from the mobile device 220. The communication device 240 may be any device configured to exchange electronic communications over a network. For example, the communication device 240 may be a wireless phone, a cellular phone, a mobile personal digital assistant (PDA) with embedded cellular phone technology, a smart phone, or a soft phone, which is a telephone integrated into a computer system. Alternatively or additionally, the communication device 240 may be integrated into a client computer system.

In one implementation, the mobile device 220 may be configured to receive an electronic communication and determine whether the electronic communication is a coded electronic communication. A coded electronic communication may include a particular message identifiable by the mobile device 220 and/or may be encrypted with a particular method and/or key. The mobile device 220 may determine whether the electronic communication is a coded electronic communication by comparing a message included in the electronic communication with one or more coded electronic messages stored on the mobile device 220 or by processing the electronic communication with a particular computational process configured to detect coded electronic communications. When the mobile device 220 identifies an electronic communication received as a coded electronic communication, the mobile device 220 may perform a function associated with the coded electronic communication. For example, the mobile device 220 may invoke an audible alert when the mobile device 220 receives a particular coded text message. The communication device 240 may be configured to send coded electronic communications to the mobile device 220.

In another implementation, processing of coded electronic communications is performed by the service provider 230. For example, the service provider 230 may receive an electronic communication addressed to the mobile device 220. The service provider 230 may access information related to coded electronic communications associated with the mobile device 220 (e.g., one or more coded messages set by the mobile device 220 and/or a computational process specific to the mobile device 220 for determining whether an electronic communication is coded) and determine whether the electronic communication is a coded electronic communication for the mobile device 220 based on the information. When the service provider 230 determines that the electronic communication is a coded electronic communication, the service provider may send a signal or other form of communication, other than or in addition to the coded electronic communication, to the mobile device 220. The mobile device 220 may be configured to perform a function in response to receiving the signal from the service provider 230.

In other implementations, identity of a sender of an electronic communication may impact performance of a function when the mobile device 220 (or service provider 230) determines that the electronic communication is a coded electronic communication. For example, when the mobile device 220 receives a coded electronic communication, the mobile device 220 may perform a function if a sender of the coded electronic communication is a first sender and may not perform the function if the sender of the coded electronic communication is a second, different sender. In another example, when the mobile device 220 receives a coded electronic communication the mobile device 220 may perform a first function if a sender of the coded electronic communication is a first sender and may perform a second function if the sender of the coded electronic communication is a second, different sender. In other examples, the mobile device 220 may determine whether to bypass device settings based on a sender of a coded electronic communication (e.g., the device will bypass a setting of silent mode if the coded electronic communication was sent from a first sender, but will not bypass a setting of silent mode if the coded electronic communication was sent from a second sender).

Figure 3:
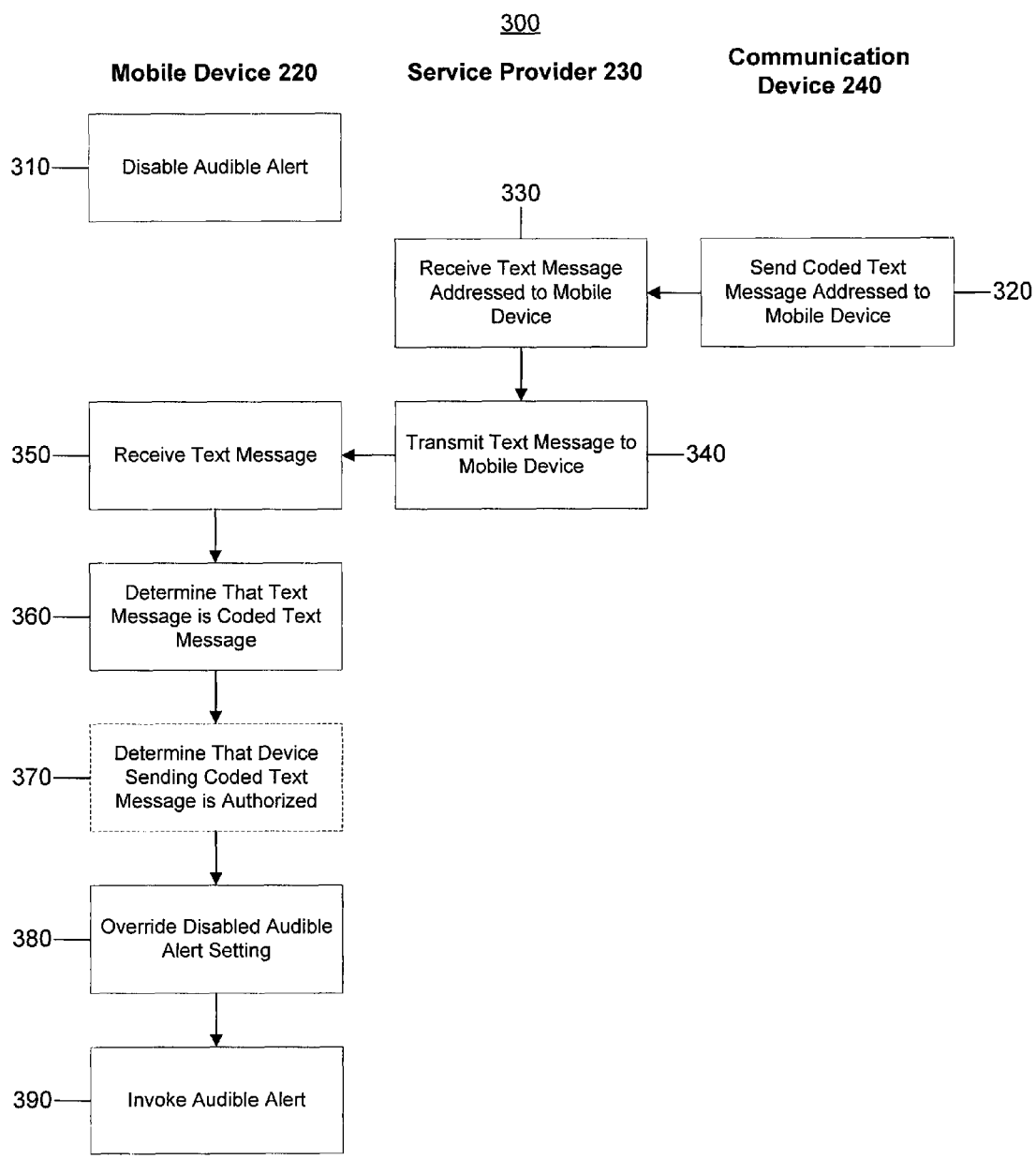
FIG. 3 is a flow chart of a process for invoking an audible alert of a mobile device.

FIG. 3 is a flow chart of a process 300 for invoking an audible alert of a mobile device. For convenience, particular components described with respect to FIG. 2 are referenced as performing the process 300. However, similar methodologies may be applied in other implementations where different components are used to define the structure of the system, or where the functionality is distributed differently among the components shown by FIG. 2.

The mobile device 220 disables an audible alert of the mobile device (310). For example, the mobile device 220 may receive user input indicating a desire to disable the audible alert of the mobile device 220 and, in response to the user input, the mobile device 220 disables the audible alert. In one implementation, the mobile device 220 may be a cellular telephone and the user input may indicate a desire to place the cellular telephone in silent mode.

The communication device 240 sends a coded text message addressed to the mobile device 220 (320). For example, the communication device 240 may send an SMS message to a telephone number associated with the mobile device 220. The coded text message may include a particular message (e.g., a password), may be encrypted with a particular method and/or key, or may include other information sufficient to indicate that the message is a coded message. The service provider 230 receives the text message addressed to the mobile device 220 sent from the communication device 240 (330) and transmits the text message to the mobile device 220 (340). For example, the service provider 230, upon receipt of the text message, processes the text message to determine the recipient of the message and forwards the message to the recipient. The service provider 230 may temporarily store the text message prior to transmitting and may perform other formatting and/or transformation operations necessary to properly transmit the text message to the mobile device 220. The service provider 230 may wait until the mobile device 220 has established a connection with the service provider 230 prior to transmitting the message or may wait until the mobile device 220 requests the message.

The mobile device 220 receives the text message from the service provider 230 (350). For example, the mobile device 220 receives an SMS message originated by the communication device 240. The mobile device 220 determines that the text message is a coded text message (360). In one example, the mobile device 220 may determine that the text message is a coded text message by comparing at least a portion of the text message with one or more coded text messages previously stored on the mobile device 220. The mobile device 220 may determine that the text message is a coded text message when the portion of the text message matches one of the one or more coded text messages. In another example, the mobile device 220 may determine that the text message is a coded text message by processing the text message with a particular computational process configured to detect coded text messages (e.g., by obtaining a particular result after decrypting the text message with a particular key).

The mobile device 220 may, optionally, determine that the device sending the coded text message is an authorized device (370). For example, the mobile device 220 may process the coded text message to determine information related to the identity of the device that sent the message. In one implementation, the mobile device 220 may determine a device identifier for the communication device 240 and compare the device identifier to a list of authorized device identifiers. In another implementation, the mobile device 220 may determine a telephone number for the communication device 240 and compare the telephone number to a list of authorized telephone numbers. In yet another implementation, the mobile device 220 may determine an identity of a user operating the communication device 240 and compare the identity of the user to a list of authorized users. The determination that the device (or user) sending the coded text is authorized may impact performance of the remaining steps. For example, if the device (or user) sending the coded text is not authorized, the mobile device may not override or disregard the disabled audible alert setting. In other examples, the identity of the user sending an electronic communication may be used instead of determining whether the electronic communication includes a code.

The mobile device 220 overrides or disregards the audible alert setting after determining that the text message is a coded text message and, optionally, after determining that the device sending the coded text message is authorized (380). For example, the mobile device 220 may override or disregard a setting that the mobile device 220 is in silent mode. Disregarding the disabled audible alert setting may allow a user to invoke the audible alert of the mobile device 220 by sending a coded text message to the mobile device 220. Being able to invoke the audible alert when the audible alert has been disabled, may allow the user to invoke the audible alert of the mobile device 220 if the mobile device 220 becomes misplaced when the audible alert of the mobile device 220 has been disabled. In addition, disregarding the disabled audible alert setting may allow another user to notify the user of the mobile device of an emergency when the audible alert of the mobile device 220 has been disabled. In some implementations, the audible alert may remain disabled after overriding or disregarding the disabled audible alert in response to receiving the coded text message (e.g., volume control settings of a communications device as configured for a silent setting may be maintained after overriding the volume control settings at the communications device).

The mobile device 220 invokes the audible alert (390). For example, the mobile device 220 may invoke a ringer included in the mobile device 220. In another example, the mobile device 220 may output a message through a speaker included in the mobile device 220. The audible alert invoked in response to receiving a coded text message may be different than a normal audible alert.

In some implementations, the mobile device 220 invokes an audible alert that represents an alarm condition. The alarm condition may be an alert that is louder or at a different pitch than a typical ring of the mobile device 220. The alarm condition may be configured to attract attention to a location of the mobile device 220. The alarm condition also may be associated with a vibrate feature or one or more illumination sources of the mobile device 220. In this regard, the mobile device 220 may be configured to vibrate and flash one or more illumination sources, in addition to invoking an audible alert, to facilitate location of the mobile device 220 in response to receipt of a coded electronic communication.

The audible alert invoked also may be an audible alert that is further configured to assist a user in locating the mobile device 220. The audible alert may be a series of audible alerts invoked at a predetermined frequency. For instance, in response to receiving a coded electronic communication, the audible alert may be invoked every 30 seconds. Repeatedly invoking an audible alert may assist a user in locating a misplaced mobile device. In the event that the user does not find the misplaced mobile device after invocation of a single audible alert, the repeated audible alerts continue to facilitate location of the mobile device without requiring the user to send additional coded electronic communications to the mobile device.

Figure 4:
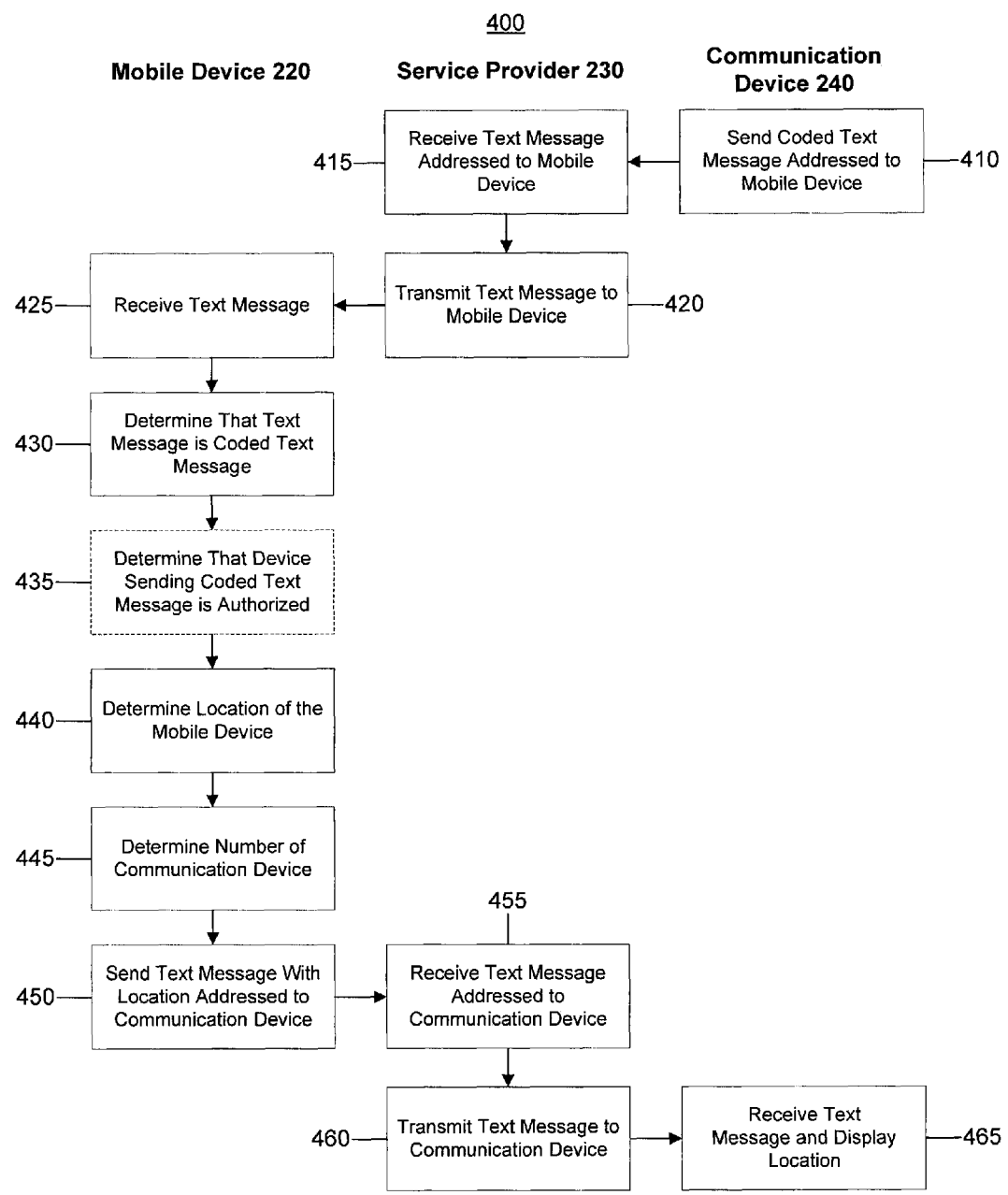
FIG. 4 is a flow chart of a process for initiating a mobile device to send a message that includes information related to the location of the mobile device.

FIG. 4 is a flow chart of a process 400 for initiating a mobile device to send a message that includes information related to the location of the mobile device. For convenience, particular components described with respect to FIG. 2 are referenced as performing the process 400. However, similar methodologies may be applied in other implementations where different components are used to define the structure of the system, or where the functionality is distributed differently among the components shown by FIG. 2.

The communication device 240 sends a coded text message addressed to the mobile device 220 (410). For example, the communication device 240 sends a coded text message addressed to the mobile device 220 using techniques described above with respect to step 320 shown in FIG. 3.

The service provider 230 receives the text message addressed to the mobile device 220 sent from the communication device 240 (415) and transmits the text message to the mobile device 220 (420). For example, the service provider 230 receives the text message addressed to the mobile device 220 sent from the communication device 240 and transmits the text message to the mobile device 220 using techniques described above with respect to steps 330 and 340 shown in FIG. 3.

The mobile device 220 receives the text message from the service provider 230 (425) and determines that the text message is a coded text message (430). For example, the mobile device 220 receives the text message from the service provider 230 and determines that the text message is a coded text message using techniques described above with respect to steps 350 and 360 shown in FIG. 3.

The mobile device 220 may, optionally, determine that the device sending the coded text message is an authorized device (435). For example, mobile device 220 determines that the device sending the coded text message is an authorized device using techniques described above with respect to step 370 shown in FIG. 3.

The mobile device 220 determines a location of the mobile device 220 (440). For example, the mobile device 220 may include a GPS receiver that is configured to receive GPS data from one or more satellites. In this example, the mobile device 220 may determine a location of the mobile device 220 using GPS data received by the GPS receiver. The mobile device 220 also may determine a location of the mobile device 220 based on signals received from one or more network access points (e.g., cellular towers) that the mobile device 220 uses to connect to a network. The mobile device 220 may determine the location as longitude and latitude coordinates, a street address, or another type of location measurement.

The mobile device 220 determines a communication address (e.g., a number) of the communication device 240 (445). For instance, the mobile device 220 may perform an identification process on the text message received from the communication device 240 to determine a telephone number of the communication device 240. The mobile device 220 also may access a telephone number of the communication device 240 from electronic storage. The telephone number of the communication device 240 may be stored in electronic storage of the mobile device 220 in advance and designated as a telephone number to which to send a text message with location information upon receipt of a coded text message.

The mobile device 220 sends a text message with location information addressed to the communication device 240 (450). For example, the mobile device 220 may send an SMS message to a telephone number associated with the communication device 240. The text message may include location information indicative of the determined location of the mobile device 220.

The service provider 230 receives the text message with location information addressed to the communication device 240 and sent from the mobile device 220 (455) and transmits the text message to the communication device 240 (460). For example, the service provider 230, upon receipt of the text message, processes the text message to determine the recipient of the message and forwards the message to the recipient. The service provider 230 may temporarily store the text message prior to transmitting and may perform other formatting and/or transformation operations necessary to properly transmit the text message to the communication device 240. The service provider 230 may wait until the communication device 240 has established a connection with the service provider 230 prior to transmitting the message or may wait until the communication device 240 requests the message.

The communication device 240 receives the text message from the service provider 230 and displays the location of the mobile device 220 (465). For example, the communication device 240 receives an SMS message that includes information indicative of the location of the mobile device 220. The communication device 240 may derive the location of the mobile device 220 from the text message and automatically, without human intervention, perform operations that assist in locating the mobile device 220. For instance, the communication device 240 may electronically generate a map of an area surrounding the location of the mobile device 220 or may determine a current location of the communication device 240 and determine directions from the current location of the communication device 240 to the location of the mobile device 220. Display of the location of the mobile device 220 using the communication device 240 may facilitate location of the mobile device 220 by a person using the communication device 240.

Figure 5:
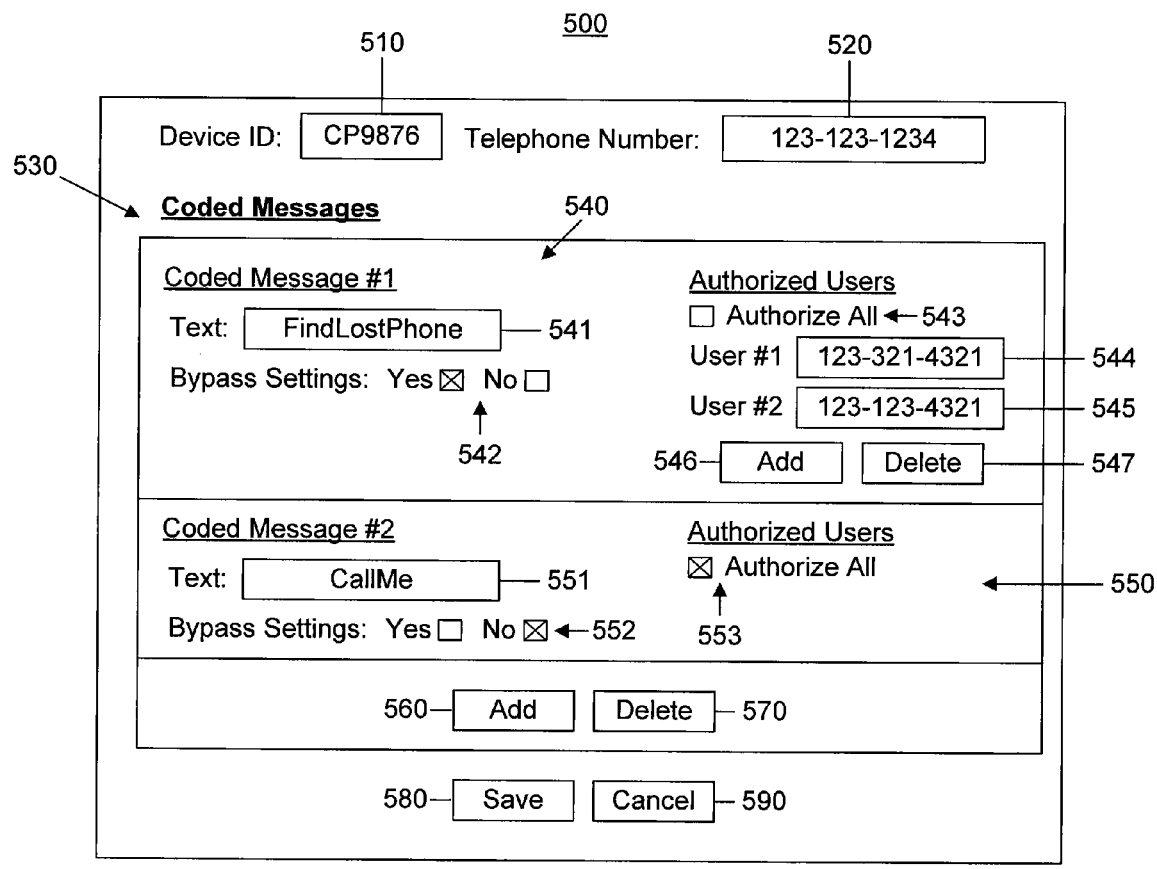
FIG. 5 illustrates an exemplary user interface for entering information related to coded messages that initiate processes that facilitate location of a mobile device.

FIG. 5 illustrates an exemplary user interface 500 for entering information related to coded messages that invoke an audible alert of a mobile device. The user interface 500 may be presented to a user wishing to change settings of coded messages that invoke the audible alert of the mobile device when received. The user interface 500 may be generated by a mobile device or a service provider providing service to the mobile device. The user interface may be presented to a user on the mobile device or on another device configured to manage settings of the mobile device.

The user interface 500 includes a device identification portion 510 identifying a device identifier for the mobile device associated with the coded messages settings and a telephone number portion 520 identifying a telephone number for the mobile device associated with the coded messages settings. The device identification portion 510 and telephone number portion 520 may include static information that a user cannot modify or may include a text field with which a user may modify the device identifier or the telephone number.

The user interface 500 also includes a coded messages portion 530 that enables a user to modify coded messages settings associated with the mobile device. The coded messages portion 530 includes a first coded message portion 540, a second coded message portion 550, an add coded message actionable item 560, and a delete coded message actionable item 570. Although the coded messages portion 530, as shown, includes a first coded message portion 540 and a second coded message portion 550, the coded messages portion 530 may include any number of coded message portions. The add coded message actionable item 560 and the delete coded message actionable item 570 enable a user to manage the number of coded messages included in the coded messages portion 530. For example, the add coded message actionable item 560, when activated, adds a new coded message portion to the coded messages portion 530 and the delete coded message actionable item 570, when activated, deletes a coded message portion included in the coded messages portion 530.

The first coded message portion 540 includes a text field 541, a bypass settings check box portion 542, an authorize all users check box 543, a first user text field 544, a second user text field 545, an add user actionable item 546, and a delete user actionable item 547. The text field 541 identifies text of the first coded message and enables a user to modify the text of the first coded message. The bypass settings check box portion 542 includes a "Yes" check box and a "No" checkbox that are mutually exclusive. The bypass settings check box portion 542 enables a user to indicate whether current settings of the mobile device should be bypassed when the mobile device receives the first coded message. The user may indicate that the current settings of the mobile device should be bypassed by checking the "Yes" check box or may indicate that the current settings of the mobile device should not be bypassed by checking the "No" check box.

The authorize all users check box 543 enables a user to authorize all users to send the first coded message. When the authorize all users check box 543 is checked, the first user text field 544, the second user text field 545, the add user actionable item 546, and the delete user actionable item 547 are not necessary and may be hidden or disabled. The first user text field 544 identifies the first authorized user and enables a user to modify the first authorized user. The first authorized user may be identified by a username, a device identifier, a telephone number (as shown), and/or any other identifying information. The second user text field 545 identifies the second authorized user and is similar to the first user text field. The add user actionable item 546, when activated, adds another user text field for the first coded message portion 540 and the delete user actionable item 547, when activated, deletes a user text field (e.g., the first user text field 544 or the second user text field 545) included in the first coded message portion 540.

The second coded message portion 550 includes a text field 551, a bypass settings check box portion 552, and an authorize all users check box 553. The text field 551, the bypass settings check box portion 552, and the authorize all users check box 553 operate in a manner similar to the text field 541, the bypass settings check box portion 542, and the authorize all users check box 543, respectively, except that the text field 551, the bypass settings check box portion 552, and the authorize all users check box 553 are associated with the second coded message.

The user interface 500 further includes a save actionable item 580 and a cancel actionable item 590. The save actionable item 580, when activated, saves the coded messages settings currently displayed by the user interface 500. The cancel actionable item 590, when activated, cancels the changes made in the user interface 500 and does not store any changes made to the coded messages settings.

As shown in FIG. 5, a user may specify a variety of coded messages settings. As shown, when a mobile device identified by device identifier CP9876 (510) and telephone number 123-123-1234 (520) receives a text message that includes the text FindLostPhone (541), the mobile device bypasses current settings of the device (542) and invokes an audible alert of the mobile device, but only if the message was sent from telephone number 123-321-4321 (544) or telephone number 123-123-4321 (545). In addition, in another example, when a mobile device identified by device identifier CP9876 (510) and telephone number 123-123-1234 (520) receives a text message that includes the text CallMe (551), the mobile device does not bypass current settings (552) and invokes an audible alert only if the audible alert is not disabled. In this example, all users sending the text message are treated in the same manner (553).

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope. For example, advantageous results still could be achieved if steps of the disclosed techniques were performed in a different order and/or if components in the disclosed systems were combined in a different manner and/or replaced or supplemented by other components. As another example, the techniques described are not limited to invoking an audible alert and may initiate performance of any function of the mobile device upon receipt of a coded electronic communication. In one implementation, receipt of a coded electronic communication may cause the mobile device to display a message. The message may be, for example, a message offering a service to a user of the mobile device or a message suggesting the user of the mobile device take a particular action. In another implementation, receipt of a coded electronic communication may cause the mobile device to download a file from a network. For example, a service provider may send the mobile device a coded electronic communication to indicate that a software update is available and the mobile device may automatically download and install the software update in response to the coded electronic communication. In another example, a friend may send the user of a mobile device a coded electronic communication indicating that the friend has obtained a new electronic media file (e.g., a picture, song, video, etc.) and the mobile device may automatically download the media file in response to receiving the coded electronic communication. Other implementations are within the scope of the description.

What is claimed is:

1. A method of invoking an audible alert at a communications device, comprising:
    enabling, at a first instance in time, a user to configure an emergency override configuration that identifies an override device that will be used to send an emergency override message using a text messaging protocol;
    receiving, at the communications device at a second instance in time, an electronic communication including a code sent using the text messaging protocol from the override device;
    parsing the code from within the received electronic communication;
    using the code parsed from within the electronic communication to determine whether to classify the received electronic communication as a coded electronic communication;
    classifying the received electronic communication as a coded electronic communication based on results of the determination; and
    in response to classification of the electronic communication as a coded electronic communication, invoking an audible alert at the communications device based on the received electronic communication, and overriding volume control settings at the communications device if the volume control settings of the communications device are configured for a silent setting.

2. The method of claim 1 wherein using the code parsed from within the electronic communication to determine whether to classify the received electronic communication as a coded electronic communication includes:
    accessing one or more known codes associated with a coded electronic communication,
    comparing the code parsed from within the electronic communication to the one or more known codes, and
    if the code parsed from within the electronic communication matches a known code, determining to classify the received electronic communication as a coded electronic communication.

3. The method of claim 1 wherein using the code parsed from within the electronic communication to determine whether to classify the received electronic communication as a coded electronic communication includes:
    accessing one or more known results obtained by performing a computational process on a code associated with a coded electronic communication,
    performing the computational process on the code parsed from within the electronic communication,
    comparing a result of the computational process obtained by performing the computational process on the code parsed from within the electronic communication to the one or more known results, and
    if the result of the computational process obtained by performing the computational process on the code parsed from within the electronic communication matches a known result, determining to classify the received electronic communication as a coded electronic communication.

4. The method of claim 1 wherein overriding the volume control settings at the communications device includes:
    comparing the volume control settings of the communications device to a threshold volume level, and
    overriding the volume control settings of the communications device based on whether they are determined to be configured for a volume level lower than the threshold volume level,
    wherein the audible alert is thereafter invoked at a volume level exceeding the threshold volume level.

5. The method of claim 1 further comprising:
    determining user identity information for a sender of the received electronic communication;
    accessing user identity information for one or more authorized senders;
    comparing the determined user identity information for the sender of the received electronic communication to the accessed user identity information for one or more authorized senders; and
    based on comparison results, determining whether the sender of the received electronic communication is an authorized sender, wherein
    invoking the audible alert at the communications device and overriding volume control settings at the communications device only if the volume control settings of the communications device are configured for the silent setting are conditioned on the sender of the received electronic communication being an authorized sender.

6. The method of claim 1 further comprising:
    maintaining the volume control settings of the communications device as configured for the silent setting after overriding the volume control settings at the communications device.

7. The method of claim 1 wherein the received electronic communication is a first electronic communication, the first electronic communication being a coded electronic communication such that receipt of the first electronic communication results in invoking the audible alert at the communications device and overriding volume control settings at the communications device only if the volume control settings of the communications device are configured for the silent setting, further comprising:
    receiving, at the communications device, a second electronic communication;
    determining that the second electronic communication does not include a code; and
    in response to determining that the second electronic communication does not include a code, applying the volume control settings at the communications device to prevent invocation of the audible alert at the communications device only if the volume control settings of the communications device are configured for the silent setting.

8. The method of claim 1 wherein the received electronic communication is a first electronic communication including a first code, the first electronic communication being a coded electronic communication such that receipt of the first electronic communication results in invoking the audible alert at the communications device and overriding volume control settings at the communications device if the volume control settings of the communications device are configured for the silent setting, further comprising:
    receiving, at the communications device, a second electronic communication including a second code;
    parsing the second code from within the second electronic communication;

analyzing the second code parsed from within the second electronic communication to determine that the second electronic communication is not a coded electronic communication;

classifying the second electronic communication as a regular electronic communication based on results of the determination; and in response to classification of the second electronic communication as a regular electronic communication, applying the volume control settings at the communications device to prevent invocation of the audible alert at the communications device if the volume control settings of the communications device are configured for the silent setting.

9. A method of initiating a mobile device to send a message including information related to a location of the mobile device, comprising:

enabling, at a first instance in time, a user to configure an emergency override configuration that identifies an override device that will be used to send an emergency override message using a text messaging protocol;

receiving, at the mobile device at a second instance in time, an electronic communication including a code, the electronic communication being sent from a communication device in response to user input provided by the user sent using the text messaging protocol from the override device;

parsing the code from within the received electronic communication;

using the code parsed from within the electronic communication to determine whether to classify the received electronic communication as a coded electronic communication;

classifying the received electronic communication as a coded electronic communication based on results of the determination; and in response to classification of the electronic communication as a coded electronic communication:

determining location information indicative of a current location of the mobile device;

determining a communication address of the communication device from which the electronic communication was sent;

generating a response electronic communication that includes the determined location information indicative of the current location of the mobile device and that is addressed to the determined communication address of the communication device from which the electronic communication was sent; and sending the response electronic communication to the communication device from which the electronic communication was sent.

10. The method of claim 9 wherein using the code parsed from within the electronic communication to determine whether to classify the received electronic communication as a coded electronic communication includes:

accessing one or more known codes associated with a coded electronic communication, comparing the code parsed from within the electronic communication to the one or more known codes, and if the code parsed from within the electronic communication matches a known code, determining to classify the received electronic communication as a coded electronic communication.

11. The method of claim 9 wherein using the code parsed from within the electronic communication to determine whether to classify the received electronic communication as a coded electronic communication includes:

accessing one or more known results obtained by performing an computational process on a code associated with a coded electronic communication, performing the computational process on the code parsed from within the electronic communication, comparing a result of the computational process obtained by performing the computational process on the code parsed from within the electronic communication to the one or more known results, and if the result of the computational process obtained by performing the computational process on the code parsed from within the electronic communication matches a known result, determining to classify the received electronic communication as a coded electronic communication.

12. The method of claim 9 further comprising:

determining user identity information for a sender of the received electronic communication;

accessing user identity information for one or more authorized senders;

comparing the determined user identity information for the sender of the received electronic communication to the accessed user identity information for one or more authorized senders; and based on comparison results, determining whether the sender of the received electronic communication is an authorized sender, wherein determining location information, determining the communication address, generating the response electronic communication, and sending the response electronic communication are conditioned on the sender of the received electronic communication being an authorized sender.

13. The method of claim 9 wherein the received electronic communication is a first electronic communication, the first electronic communication being a coded electronic communication such that receipt of the first electronic communication results in determining location information, determining the communication address, generating the response electronic communication, and sending the response electronic communication, further comprising:

receiving, at the communications device, a second electronic communication, the electronic communication being sent from the communication device in response to user input provided by the user;

determining that the second electronic communication does not include a code; and in response to determining that the second electronic communication does not include a code, processing the second electronic communication without determining location information, determining a communication address, generating a response electronic communication, and sending a response electronic communication.

14. The method of claim 9 wherein the received electronic communication is a first electronic communication including a first code, the first electronic communication being a coded electronic communication such that receipt of the first electronic communication results in determining location information, determining the communication address, generating the response electronic communication, and sending the response electronic communication, further comprising:

receiving, at the communications device, a second electronic communication including a second code;

parsing the second code from within the second electronic communication;

analyzing the second code parsed from within the second electronic communication to determine that the second electronic communication is not a coded electronic communication;

classifying the second electronic communication as a regular electronic communication based on results of the determination;

in response to classification of the second electronic communication as a regular electronic communication, processing the second electronic communication without determining location information, determining a communication address, generating a response electronic communication, and sending a response electronic communication.

15. The method of claim 9 wherein determining the communication address of the communication device from which the electronic communication was sent includes determining a communication address using a caller identification process on the received electronic communication.

16. The method of claim 9:
wherein receiving, at the mobile device, the electronic communication including the code, the electronic communication being sent from the communication device in response to user input provided by the user includes receiving, at a first cellular telephone, an SMS message including the code, the SMS message being sent from a second cellular telephone in response to user input provided by the user;

wherein parsing the code from within the received electronic communication includes parsing text of the SMS message to identify the code;

wherein using the code parsed from within the electronic communication to determine whether to classify the received electronic communication as a coded electronic communication includes using the parsed text of the SMS message to determine whether to classify the received SMS message as a coded SMS message;

wherein classifying the received electronic communication as a coded electronic communication based on results of the determination includes classifying the received SMS message as a coded SMS message based on results of the determination;

wherein determining location information indicative of the current location of the mobile device includes determining longitude and latitude coordinates of a current location of the first cellular telephone based on GPS data obtained by the first cellular telephone;

wherein determining the communication address of the communication device from which the electronic communication was sent includes determining a telephone number of the second cellular telephone from which the SMS message was sent;

wherein generating the response electronic communication that includes the determined location information indicative of the current location of the mobile device and that is addressed to the determined communication address of the communication device from which the electronic communication was sent includes generating a response SMS message that includes the determined longitude and latitude coordinates of the current location of the first cellular telephone and that is addressed to the determined telephone number of the second cellular telephone from which the SMS message was sent; and wherein sending the response electronic communication to the communication device from which the electronic communication was sent includes sending the response SMS message to the second cellular telephone from which the SMS message was sent.

17. A method of facilitating location of a communications device, comprising:
enabling, at a first instance in time, a user to configure an emergency override configuration that identifies an override device that will be used to send an emergency override message using a text messaging protocol;

receiving, at the communications device at a second instance in time, an electronic communication including a code sent using the text messaging protocol from the override device;

parsing the code from within the received electronic communication;

using the code parsed from within the electronic communication to determine whether to classify the received electronic communication as a coded electronic communication;

classifying the received electronic communication as a coded electronic communication based on results of the determination;

in response to classification of the electronic communication as a coded electronic communication, automatically, without human intervention, initiating a process that facilitates location of the communication device.

18. The method of claim 17 wherein automatically, without human intervention, initiating the process that facilitates location of the communication device includes overriding volume control settings at the communications device and invoking an audible alert at the communications device based on the received electronic communication.

19. The method of claim 17 wherein automatically, without human intervention, initiating the process that facilitates location of the communication device includes generating and sending a response electronic communication that includes location information indicative of a current location of the communication device.

20. The method of claim 17 wherein automatically, without human intervention, initiating the process that facilitates location of the communication device includes:
overriding volume control settings at the communications device and invoking an audible alert at the communications device based on the received electronic communication, and generating and sending a response electronic communication that includes location information indicative of a current location of the communication device.

* * * * *